(12) United States Patent
Lee et al.

(10) Patent No.: US 12,378,133 B2
(45) Date of Patent: Aug. 5, 2025

(54) METHOD OF PREPARING POSITIVE ELECTRODE ACTIVE MATERIAL FOR SECONDARY BATTERY

(71) Applicant: LG Chem, Ltd., Seoul (KR)

(72) Inventors: Kyung Lok Lee, Daejeon (KR); Ji A Shin, Daejeon (KR); Min Kyu You, Daejeon (KR); Sang Soon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1062 days.

(21) Appl. No.: 17/422,014

(22) PCT Filed: Jan. 21, 2020

(86) PCT No.: PCT/KR2020/000996
§ 371 (c)(1),
(2) Date: Jul. 9, 2021

(87) PCT Pub. No.: WO2020/153701
PCT Pub. Date: Jul. 30, 2020

(65) Prior Publication Data
US 2022/0098054 A1 Mar. 31, 2022

(30) Foreign Application Priority Data
Jan. 21, 2019 (KR) ........................ 10-2019-0007296

(51) Int. Cl.
| | | |
|---|---|---|
| *C01G 53/50* | (2025.01) | |
| *H01M 4/02* | (2006.01) | |
| *H01M 4/04* | (2006.01) | |
| *H01M 4/505* | (2010.01) | |
| *H01M 4/525* | (2010.01) | |

(52) U.S. Cl.
CPC .......... *C01G 53/50* (2013.01); *H01M 4/0471* (2013.01); *H01M 4/505* (2013.01); *H01M 4/525* (2013.01); *C01P 2002/32* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 10,818,916 B2* | 10/2020 | Shin | .................... | H01M 4/0471 |
| 10,862,156 B2* | 12/2020 | Lee | .................... | H01M 10/058 |
| 2007/0015058 A1* | 1/2007 | Takezawa | .......... | H01M 10/0525 |
| | | | | 429/231.95 |
| 2010/0112447 A1 | 5/2010 | Yamamoto et al. | | |
| 2012/0319037 A1 | 12/2012 | Kawahashi et al. | | |
| 2012/0326077 A1 | 12/2012 | Petrovic et al. | | |
| 2015/0140431 A1 | 5/2015 | Kitagawa et al. | | |
| 2016/0156020 A1 | 6/2016 | Tokoro et al. | | |
| 2016/0172673 A1 | 6/2016 | Toya et al. | | |
| 2016/0190549 A1 | 6/2016 | Ohara et al. | | |
| 2017/0170513 A1 | 6/2017 | Sakamoto et al. | | |
| 2017/0288215 A1 | 10/2017 | Mitsumoto et al. | | |
| 2018/0048015 A1 | 2/2018 | Lee et al. | | |
| 2018/0175387 A1* | 6/2018 | Kim | ..................... | H01M 4/134 |
| 2018/0261842 A1 | 9/2018 | Park et al. | | |
| 2019/0300382 A1 | 10/2019 | Kim et al. | | |

FOREIGN PATENT DOCUMENTS

| | | |
|---|---|---|
| CN | 103159264 A | 6/2013 |
| CN | 104900869 A | 9/2015 |
| CN | 105355906 A | 2/2016 |
| CN | 105895900 A | 8/2016 |
| JP | 2014523070 A | 9/2014 |
| JP | 2016091626 A | 5/2016 |
| JP | 2016110982 A | 6/2016 |
| JP | 2018049684 A | 3/2018 |
| JP | 2018129140 A | 8/2018 |
| KR | 100261508 B1 | 7/2000 |
| KR | 20100090744 A | 8/2010 |
| KR | 20140148408 A | 12/2014 |
| KR | 20150135449 A | 12/2015 |
| KR | 20160063982 A | 6/2016 |
| KR | 20160130467 A | 11/2016 |
| KR | 20170038485 A | 4/2017 |
| KR | 20170048244 A | 5/2017 |
| KR | 20170063408 A | 6/2017 |
| KR | 20170081799 A | 7/2017 |
| KR | 20180025028 A | 3/2018 |
| KR | 101871075 B1 | 6/2018 |
| KR | 20180065680 A | 6/2018 |
| KR | 20180077026 A | 7/2018 |
| KR | 20180077081 A | 7/2018 |
| KR | 20180111323 A | 10/2018 |
| WO | 2012098724 A1 | 7/2012 |
| WO | 2017095134 A1 | 6/2017 |

OTHER PUBLICATIONS

Vasu, S., et al. In-situ carbon encapsulation of LiNi1/3Co1/3Mn1/3O2 using pillared ethylene glycol trapped in the metal hydroxide interlayers for enhanced cyclic stability. Electrochimica Acta 251 (2017) 363-377. (Year: 2017).*
Extended European Search Report including Written Opinion for Application No. 20745018.0 dated Feb. 8, 2022, pp. 1-7.
Search Report dated Oct. 26, 2022 from Office Action for Chinese Application No. 2020800090783 issued Nov. 3, 2022. 3 pgs.
International Search Report for Application No. PCT/KR2020/000996 mailed Apr. 29, 2020, pp. 1-2.

* cited by examiner

*Primary Examiner* — Anthony J Zimmer
*Assistant Examiner* — Zachary John Baum
(74) *Attorney, Agent, or Firm* — Lerner David LLP

(57) ABSTRACT

A method of preparing a positive electrode active material for a secondary battery includes preparing a positive electrode active material precursor containing 60 mol % or more of nickel (Ni) among total metals, mixing the positive electrode active material precursor and a lithium raw material source and performing primary pre-sintering in an oxidizing atmosphere to form a pre-sintered product, and performing secondary main sintering on the pre-sintered product in an air atmosphere to form a lithium transition metal oxide.

6 Claims, No Drawings

METHOD OF PREPARING POSITIVE ELECTRODE ACTIVE MATERIAL FOR SECONDARY BATTERY

CROSS-REFERENCE TO RELATED APPLICATIONS

The present application is a national phase entry under 35 U. S. C. § 371 of International Application No. PCT/KR2020/000996, filed on Jan. 21, 2020, which claims priority from Korean Patent Application No. 10-2019-0007296, filed on Jan. 21, 2019, the disclosures of which are incorporated by reference herein.

TECHNICAL FIELD

The present invention relates to a method of preparing a positive electrode active material for a secondary battery.

BACKGROUND ART

Recently, with the rapid spread of electronic devices using batteries, such as mobile phones, notebook computers, and electric vehicles, demand for secondary batteries with relatively high as well capacity as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium transition metal oxide' or 'NCA-based lithium transition metal oxide') in which a portion of nickel (Ni) is substituted with cobalt (Co) or manganese (Mn)/aluminum (Al), has been developed. However, since capacity characteristics of conventionally developed NCM-based/NCA-based lithium transition metal oxides are insufficient, the NCM-based/NCA-based lithium transition metal oxides have been limited in application.

Thus, in order to improve the capacity characteristics, studies have been made to increase a nickel (Ni) content in the NCM-based/NCA-based lithium transition metal oxides. However, with respect to a high-Ni positive electrode active material with a high nickel content, it may achieve higher capacity than a layered structure positive electrode active material having a different composition, but since its surface is unstable and vulnerable to moisture, performance may be rapidly degraded depending on a moisture content. Also, when using the high-Ni positive electrode active material, it presents various battery performance degradation problems, such as high initial resistance, a decrease in high-temperature lifetime, and a rapid increase in resistance. Furthermore, with respect to the high-Ni positive electrode active material, since an average oxidation number of nickel should be closer to 3 than that of a low-Ni positive electrode active material, more oxygen is consumed in this case. Thus, a reaction proceeds more uniformly and rapidly when sintered at a higher oxygen partial pressure than an air atmosphere. Thus, typically, since the high-Ni positive electrode active material was prepared in an oxidizing atmosphere, there was a limitation in that an amount of high-concentration oxygen consumed was large and manufacturing costs increased.

Therefore, there is still a need to develop a high-Ni positive electrode active material which may have excellent crystallinity, may improve stability, and may improve resistance characteristics and life characteristics of the secondary battery while reducing manufacturing costs by reducing an amount of oxygen consumed in a preparation process.

DISCLOSURE OF THE INVENTION

Technical Problem

An aspect of the present invention provides a preparation method, which may prepare a high-Ni positive electrode active material having excellent crystallinity and improved structural stability while reducing manufacturing costs by reducing an amount of oxygen consumed in a preparation process, in the preparation of the positive electrode active material of a high-Ni lithium transition metal oxide.

Technical Solution

According to an aspect of the present invention, there is provided a method of preparing a positive electrode active material for a secondary battery which includes: preparing a positive electrode active material precursor containing 60 mol % or more of nickel (Ni) among total metals; mixing the positive electrode active material precursor and a lithium raw material source, and performing primary pre-sintering in an oxidizing atmosphere to form a pre-sintered product; and performing secondary main sintering on the pre-sintered product in an air atmosphere to form a lithium transition metal oxide.

Advantageous Effects

According to the present invention, in the preparation of a positive electrode active material of a high-Ni lithium transition metal oxide, manufacturing costs may be reduced by reducing an amount of oxygen consumed in a preparation process. Also, the high-Ni positive electrode active material prepared according to the preparation method of the present invention may have excellent crystallinity and improved structural stability due to a uniform reaction of a positive electrode active material precursor and a lithium raw material source. Furthermore, initial resistance of a lithium secondary battery may be reduced, high-temperature life characteristics may be improved, and an increase in resistance may be suppressed when the high-Ni positive electrode active material prepared according to the preparation method of the present invention is used.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Method of Preparing Positive Electrode Active Material>

The positive electrode active material of the present invention is prepared by a method including the steps of: preparing a positive electrode active material precursor containing 60 mol % or more of nickel (Ni) among total metals; mixing the positive electrode active material precursor and a lithium raw material source, and performing primary pre-sintering in an oxidizing atmosphere to form a pre-sintered product; and performing secondary main sintering on the pre-sintered product in an air atmosphere to form a lithium transition metal oxide.

The method of preparing the positive electrode active material will be described in detail for each step.

First, a positive electrode active material precursor containing 60 mol % or more of nickel (Ni) among total metals is prepared. The positive electrode active material precursor may be a compound including nickel (Ni), cobalt (Co), and manganese (Mn), or a compound including nickel (Ni), cobalt (Co), and aluminum (Al). A high-Ni lithium transition metal oxide may be prepared by using the positive electrode active material precursor in which an amount of the nickel (Ni) is 60 mol % or more, and the amount of the nickel (Ni) among the total metals may preferably be 70 mol % or more and may more preferably be 80 mol % or more. As described above, the lithium transition metal oxide prepared by using the positive electrode active material precursor containing 60 mol % or more of the nickel (Ni) among the total metals may ensure high capacity.

The positive electrode active material precursor may be used by purchasing a commercially available positive electrode active material precursor, or may be prepared according to a method of preparing a positive electrode active material precursor which is well known in the art.

For example, the positive electrode active material precursor including nickel (Ni), cobalt (Co), and manganese (Mn) may be prepared by a co-precipitation reaction by adding an ammonium cation-containing complexing agent and a basic compound to a transition metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include $Co(OH)_2$, $CoOOH$, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal solution may be prepared by adding the nickel-containing raw material, the cobalt-containing raw material, and the manganese-containing raw material to a solvent, specifically water, or a mixture of water and an organic solvent (e.g., alcohol etc.) which may be uniformly mixed with the water, or may be prepared by mixing an aqueous solution of the nickel-containing raw material, an aqueous solution of the cobalt-containing raw material, and an aqueous solution of the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $(NH_4)_2CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as $NaOH$, $KOH$, or $Ca(OH)_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent.

The basic compound is added to adjust a pH of a reaction solution, wherein the basic compound may be added in an amount such that the pH of the metal solution is 11 to 13.

The co-precipitation reaction may be performed in a temperature range of 40° C. to 70° C. in an inert atmosphere such as nitrogen or argon.

Particles of a nickel-cobalt-manganese hydroxide are formed by the above-described process, and are precipitated in the reaction solution. Concentrations of the nickel-containing raw material, the cobalt-containing raw material, and the manganese-containing raw material may be adjusted to prepare a precursor in which the amount of the nickel (Ni) among the total metals is 60 mol % or more. The precipitated nickel-cobalt-manganese hydroxide particles may be separated according to a conventional method and dried to prepare a nickel-cobalt-manganese precursor.

Next, the positive electrode active material precursor is mixed with a lithium raw material source and primary pre-sintering is performed in an oxidizing atmosphere to prepare a pre-sintered product.

As the lithium raw material source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

The primary pre-sintering is performed in an oxidizing atmosphere, wherein, in this case, the oxidizing atmosphere may mean that the sintering is performed while supplying oxygen. The primary pre-sintering may be performed while supplying oxygen at a rate of 10 m³/min to 600 m³/min, and the oxygen may more preferably be supplied at a rate of 200 m³/min to 400 m³/min.

A sintering temperature of the primary pre-sintering may be in a range of 400° C. to 700° C., preferably 450° C. to 650° C., and more preferably 500° C. to 600° C. Since the primary pre-sintering is performed within the above sintering temperature range, lithium and the precursor react to more quickly form a pre-sintered product having a layered structure and a spinel-like structure, and thus, there may be an effect of reducing an amount of oxygen consumed.

The primary pre-sintering may be performed for 3 hours to 7 hours after the target sintering temperature is reached, and may more preferably be performed for 4 hours to 6 hours. Since the primary pre-sintering is performed within the above sintering time range, structural stability of the finally-prepared positive electrode active material is effectively improved, a moisture content is reduced, and a uniform reaction is induced, and thus, a positive electrode active material having a uniform performance with little dispersion may be formed and production efficiency may be improved by consuming only as much oxygen as necessary for performance improvement.

The pre-sintered product formed by the primary pre-sintering as described above may have a structure including the layered structure and the spinel-like structure. Since the structure including the layered structure and the spinel-like structure is formed in the pre-sintered product, sufficient oxygen is contained in the structure, and, subsequently, there is no need to maintain the oxidizing atmosphere. Thus, since the supply of oxygen is stopped in the subsequent secondary main sintering to not only reduce the amount of the oxygen consumed but also prevent a decrease in internal temperature of a sintering furnace due to the introduction of the oxygen, a uniform positive electrode active material having better crystallinity may be prepared even if the sintering is performed at the same sintering temperature.

Next, a lithium transition metal oxide is formed by performing secondary main sintering on the pre-sintered product in an air atmosphere.

As described above, the secondary main sintering may be performed without maintaining the oxidizing atmosphere of the primary pre-sintering, that is, may be performed in the air atmosphere after stopping the supply of oxygen in the primary pre-sintering. Since the structure including the layered structure and the spinel-like structure is formed in the pre-sintered product that is formed by the primary pre-sintering, oxygen may not be continuously supplied in the secondary main sintering and the decrease in the temperature due to the introduction of the oxygen may be rather prevented to assist the uniform reaction of the positive electrode active material precursor and the lithium raw material source and prepare a positive electrode active material of a lithium transition metal oxide having excellent crystallinity and improved structural stability. Also, since the oxygen is supplied only in the primary pre-sintering, the amount of the oxygen consumed is significantly reduced in comparison to that in the previous preparation process in which the total sintering process is performed in the oxidizing atmosphere, and thus, manufacturing costs may be reduced.

A sintering temperature f the secondary main sintering may be in a range of 700° C. to 1,000° C., preferably 725° C. to 900° C., and more preferably 750° C. to 800° C. Since the secondary main sintering is performed within the above sintering temperature range, there may be an effect capable of synthesizing a positive electrode active material which structurally has less cation mixing (cation disorder) and is electrochemically excellent.

The secondary main sintering may be performed for 4 hours to 15 hours after the target sintering temperature is reached, and may more preferably be performed for 5 hours to 10 hours.

The lithium transition metal oxide thus formed, for example, may be represented by Formula 1 below.

$$Li_pNi_{1-(x1+y1+z1)}Co_{x1}M^a_{y1}M^b_{z1}O_{2+\delta}$$ [Formula 1]

In Formula 1, $M^a$ is at least one element of Mn and Al, $M^b$ is at least one element selected from the group consisting of Al, zirconium (Zr), titanium (Ti), magnesium (Mg), tantalum (Ta), niobium (Nb), molybdenum (Mo), chromium (Cr), barium (Ba), strontium (Sr), tungsten (W), and calcium (Ca), $0.9 \leq p \leq 1.3$, $0 \leq x1 \leq 0.5$, $0 \leq y1 \leq 0.5$, $0 \leq z1 \leq 0.1$, $0 \leq x1+y1+z1 \leq 0.4$, and $-0.1 \leq \delta \leq 1$.

In the lithium transition metal oxide of Formula 1, lithium (Li) may be included in an amount corresponding to p, that is, $0.9 \leq p \leq 1.3$. When p is less than 0.9, capacity may be reduced, and, when p is greater than 1.3, milling is difficult due to an increase in strength of the sintered positive electrode active material and there may be an increase in amount of gas generated due to an increase in Li by-product. The Li may more preferably be included in an amount satisfying $1.0 \leq p \leq 1.1$, in consideration of balance between a capacity characteristics improvement effect of the positive electrode active material and sinterability during the preparation of the active material due to the control of the amount of the Li.

In the lithium transition metal oxide of Formula 1, Ni may be included in an amount corresponding to $1-(x1+y1+z1)$, for example, $0.6 \leq 1-(x1+y1+z1) \leq 0.99$. If the amount of the Ni in the lithium transition metal oxide of Formula 1 is 0.6 or more, since the amount of Ni, which is sufficient to contribute to charge and discharge, is secured, higher capacity may be achieved. The Ni may more preferably be included in an amount satisfying $0.8 \leq 1-(x1+y1+z1) \leq 0.99$.

In the lithium transition metal oxide of Formula 1, Co may be included in an amount corresponding to x1, that is, $0 \leq x1 \leq 0.5$. In a case in which the amount of the Co in the lithium transition metal oxide of Formula 1 is greater than 0.5, there is a concern that cost may increase. The Co may specifically be included in an amount satisfying $0.2 \leq x1 \leq 0.4$ in consideration of a significant capacity characteristics improvement effect due to the inclusion of the Co.

In the lithium transition metal oxide of Formula 1, $M^a$ may be included in an amount corresponding to y1, that is, $0 \leq y1 \leq 0.5$. Mn may improve stability of the positive electrode active material, and, as a result, may improve stability of the battery. The $M^a$ may specifically be included in an amount satisfying $0.05 \leq y1 \leq 0.4$.

In the lithium transition metal oxide of Formula 1, $M^b$ may be a doping element included in a crystal structure of the lithium transition metal oxide, wherein the $M^b$ may be included in an amount corresponding to z1, that is, $0 \leq z1 \leq 0.1$.

As described above, initial resistance of a lithium secondary battery may be reduced, high-temperature life characteristics may be improved, and an increase in resistance may be suppressed when the high-Ni lithium transition metal oxide positive electrode active material prepared according to the preparation method of the present invention is used.

<Positive Electrode and Secondary Battery>

According to another embodiment of the present invention, provided are a positive electrode for a secondary battery and a lithium secondary battery which include the positive electrode active material prepared as described above.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a (semi) metal-based material alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the (semi) metal-based material and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, mesocarbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond, an aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one example, a halo-alkylene carbonate-based additive, for compound such as difluoroethylene carbonate, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a 5 L batch-type reactor set at 60° C., $NiSO_4$, $CoSO_4$, and $MnSO_4$ were mixed in water in amounts such that a molar ratio of nickel:cobalt:manganese was 8:1:1 to prepare a precursor-forming solution with a concentration of 2.4 M. 1 L of deionized water was put in a co-precipitation reactor (capacity 5 L), and the reactor was then purged with nitrogen gas at a rate of 2 L/min to remove dissolved oxygen in the water and create a non-oxidizing atmosphere in the reactor. Thereafter, 10 ml of a 25% NaOH aqueous solution was added, and stirring was then performed at a speed of 1,200 rpm and a temperature of 60° C. to maintain a pH at 12.0.

Subsequently, a co-precipitation reaction was performed for 18 hours while adding the precursor-forming solution at a rate of 180 ml/hr together with a NaOH aqueous solution and a $NH_4OH$ aqueous solution to form particles of a nickel-cobalt-manganese-containing hydroxide ($Ni_{0.8}Co_{0.1}Mn_{0.1}(OH)_2$). The hydroxide particles were separated, washed, and then dried in an oven at 120° C. to prepare a positive electrode active material precursor.

The positive electrode active material precursor thus prepared and a lithium raw material (LiOH) were added to a Henschel mixer (700 L) such that a final molar ratio of Li/M(Ni, Co, Mn) was 1.05, and were mixed at a center speed of 300 rpm for 20 minutes. After the mixed powder was put in an alumina crucible with a size of 330 mm×330 mm and the temperature was increased to 600° C. while supplying oxygen ($O_2$) at a rate of 300 m³/min, primary pre-sintering was performed for 3 hours to form a pre-sintered product.

Thereafter, after the supply of the oxygen ($O_2$) was stopped and the temperature was increased to 740° C. in an air atmosphere, secondary main sintering was performed for 14 hours to prepare a positive electrode active material.

Example 2

A positive electrode active material was prepared in the same manner as in Example 1 except that the primary pre-sintering was performed at 500° C.

Example 3

A positive electrode active material was prepared in the same manner as in Example 1 except that the primary pre-sintering was performed at 400° C.

Example 4

A positive electrode active material was prepared in the same manner as in Example 1 except that the primary pre-sintering was performed for 4 hours after the temperature was increased to 600° C.

Comparative Example 1

The positive electrode active material precursor prepared as in Example 1 and a lithium raw material (LiOH) were added to a Henschel mixer (700 L) such that a final molar ratio of Li/M(Ni, Co, Mn) was 1.05, and were mixed at a center speed of 300 rpm for 20 minutes. After the mixed powder was put in an alumina crucible with a size of 330 mm×330 mm and the temperature was increased to 750° C. in an air atmosphere, sintering was performed for 14 hours to prepare a positive electrode active material.

Comparative Example 2

A positive electrode active material was prepared in the same manner as in Example 1 except that primary pre-sintering was performed as in Example 1, but secondary main sintering was performed while supplying oxygen ($O_2$) at a rate of 300 m³/min.

Comparative Example 3

A positive electrode active material was prepared in the same manner as in Example 1 except that primary pre-sintering was performed in an air atmosphere with no oxygen ($O_2$) supply and secondary main sintering was performed while supplying oxygen ($O_2$) at a rate of 300 m³/min.

Comparative Example 4

A positive electrode active material was prepared in the same manner as in Example 1 except that primary pre-sintering was performed in an air atmosphere with no oxygen ($O_2$) supply.

Experimental Example 1: Moisture Content Evaluation

Moisture contents of the positive electrode active materials prepared in Examples 1 to 4 and Comparative Examples 1 to 4 were measured using a Karl Fischer instrument (Karl Fischer Volumetric, Metrohm, 831 KF Titrino Coulometer). Specifically, after about 0.1 g to about 2 g of each positive electrode active material was put in a vial and sealed with an aluminum cap, iodine and sulfur dioxide were quantitatively reacted with water at a temperature of 200° C. to measure an amount of moisture contained in the positive electrode active material. The results thereof are presented in Table 1 below.

Experimental Example 2: Life Characteristics and Resistance Evaluation

Each of the positive electrode active materials prepared in Examples 1 to 4 and Comparative Examples 1 to 4, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 130° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC=3/5/2).

Each lithium secondary battery half cell prepared as described above was charged at 0.2 C to a voltage of 4.25 V in a constant current/constant voltage (CCCV) mode at 25° C. (termination current of 0.005° C.), and discharged at a constant current of 0.2 C to a voltage of 2.5 V to measure initial discharge capacity and initial resistance. Thereafter, each half cell was charged at 0.3 C to a voltage of 4.25 V in a CCCV mode at 45° C., and discharged at a constant current of 0.3 C to a voltage of 2.5 V to measure capacity retention and a resistance increase rate when 30 cycles of charge and discharge were performed. The results thereof are presented in Table 1.

TABLE 1

|  | Moisture content (ppm) | Initial discharge capacity (mAh/g) | Capacity retention (%) (@30th cycle) | Initial resistance (Ω) | Resistance increase rate (%) (@30th cycle) |
|---|---|---|---|---|---|
| Example 1 | 400 | 219.6 | 94.9 | 22.3 | 206.1 |
| Example 2 | 500 | 218.6 | 95.2 | 22.6 | 204.9 |
| Example 3 | 800 | 218.2 | 95.1 | 22.9 | 199.6 |
| Example 4 | 400 | 219.5 | 94.8 | 22.6 | 206.4 |
| Comparative Example 1 | 1100 | 215.6 | 92.2 | 27.1 | 230.6 |
| Comparative Example 2 | 500 | 215.4 | 92.3 | 28.7 | 251.2 |
| Comparative Example 3 | 1000 | 210.1 | 89.8 | 31.6 | 283.2 |
| Comparative Example 4 | 1200 | 209.8 | 88.9 | 31.1 | 330.6 |

Referring to Table 1, it may be confirmed that moisture contents of the positive electrode active materials prepared in Examples 1 to 4 were significantly reduced in comparison to those of the positive electrode active materials prepared in Comparative Examples 1, 3 and 4. Also, with respect to Examples 1 to 4, it may be understood that capacity retentions were increased and initial resistances and resistance increase rates were significantly reduced in comparison to those of Comparative Examples 1 to 4.

The invention claimed is:

1. A method of preparing a positive electrode active material for a secondary battery, comprising:
   preparing a positive electrode active material precursor containing 60 mol % or more of nickel (Ni) among total metals;
   mixing the positive electrode active material precursor and a lithium raw material source, and performing primary pre-sintering in an oxidizing atmosphere to form a pre-sintered product; and
   performing secondary main sintering on the pre-sintered product in an air atmosphere to form a lithium transition metal oxide,
   wherein the primary pre-sintering is performed while supplying oxygen,
   wherein the primary pre-sintering is performed for 3 hours to 7 hours after a sintering temperature is reached,
   wherein the secondary main sintering is performed after stopping oxygen supply,
   wherein the positive electrode active material precursor is a compound including nickel (Ni), cobalt (Co), and manganese (Mn), and
   wherein the pre-sintered product has a structure including a layered structure.

2. The method of claim 1, wherein a sintering temperature of the primary pre-sintering is in a range of 400° C. to 700° C.

3. The method of claim 1, wherein a sintering temperature of the secondary main sintering is in a range of 700° C. to 1,000° C.

4. The method of claim 1, wherein the pre-sintered product has a structure including a layered structure.

5. The method of claim 1, wherein the positive electrode active material precursor contains 80 mol % or more of the nickel (Ni) among the total metals.

6. The method of claim 1, wherein the lithium transition metal oxide is represented by Formula 1:

$$Li_p Ni_{1-(x1+y1+z1)} Co_{x1} M^a_{y1} M^b_{z1} O_{2+\delta}$$ [Formula 1]

wherein, in Formula 1, $M^a$ is manganese (Mn), or manganese (Mn) and aluminum (Al), $M^b$ is at least one element selected from the group consisting of Al, zirconium (Zr), titanium (Ti), magnesium (Mg), tantalum (Ta), niobium (Nb), molybdenum (Mo), chromium (Cr), barium (Ba), strontium (Sr), tungsten (W), and calcium (Ca), $0.9 \leq p \leq 1.3$, $0 \leq x1 < 0.5$, $0 \leq y1 \leq 0.5$, $0 \leq z1 \leq 0.1$, $0 \leq x1+y1+z1 \leq 0.4$, and $-0.1 \leq \delta \leq 1$.

* * * * *